Dec. 6, 1960 K. W. KENSHOL 2,963,033
SPRAY GUN FOR FUSIBLE MATERIALS
Filed Sept. 23, 1955 6 Sheets-Sheet 1

INVENTOR.
KENNETH W. KENSHOL
BY
ATTORNEY

Dec. 6, 1960 K. W. KENSHOL 2,963,033
SPRAY GUN FOR FUSIBLE MATERIALS
Filed Sept. 23, 1955 6 Sheets-Sheet 2
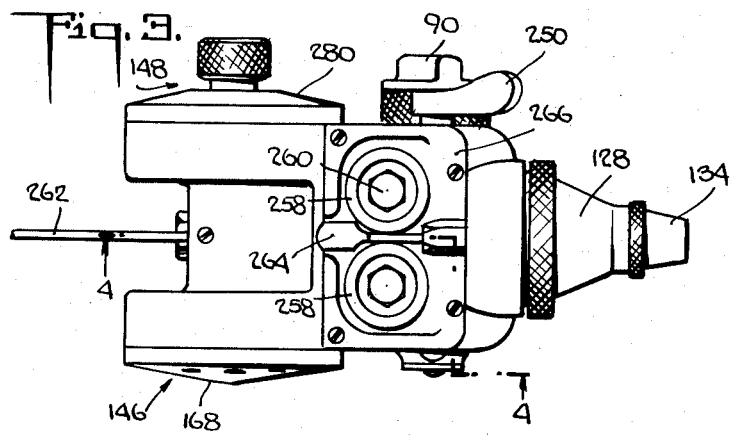
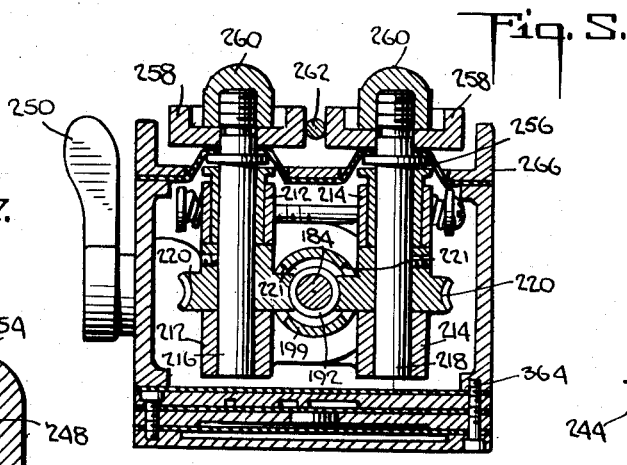
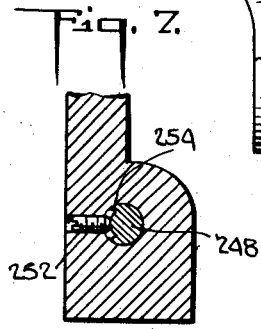
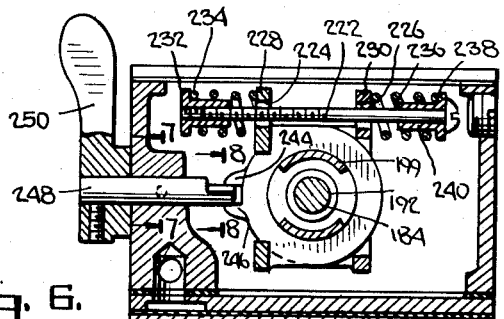
INVENTOR.
KENNETH W. KENSHOL
BY
ATTORNEY

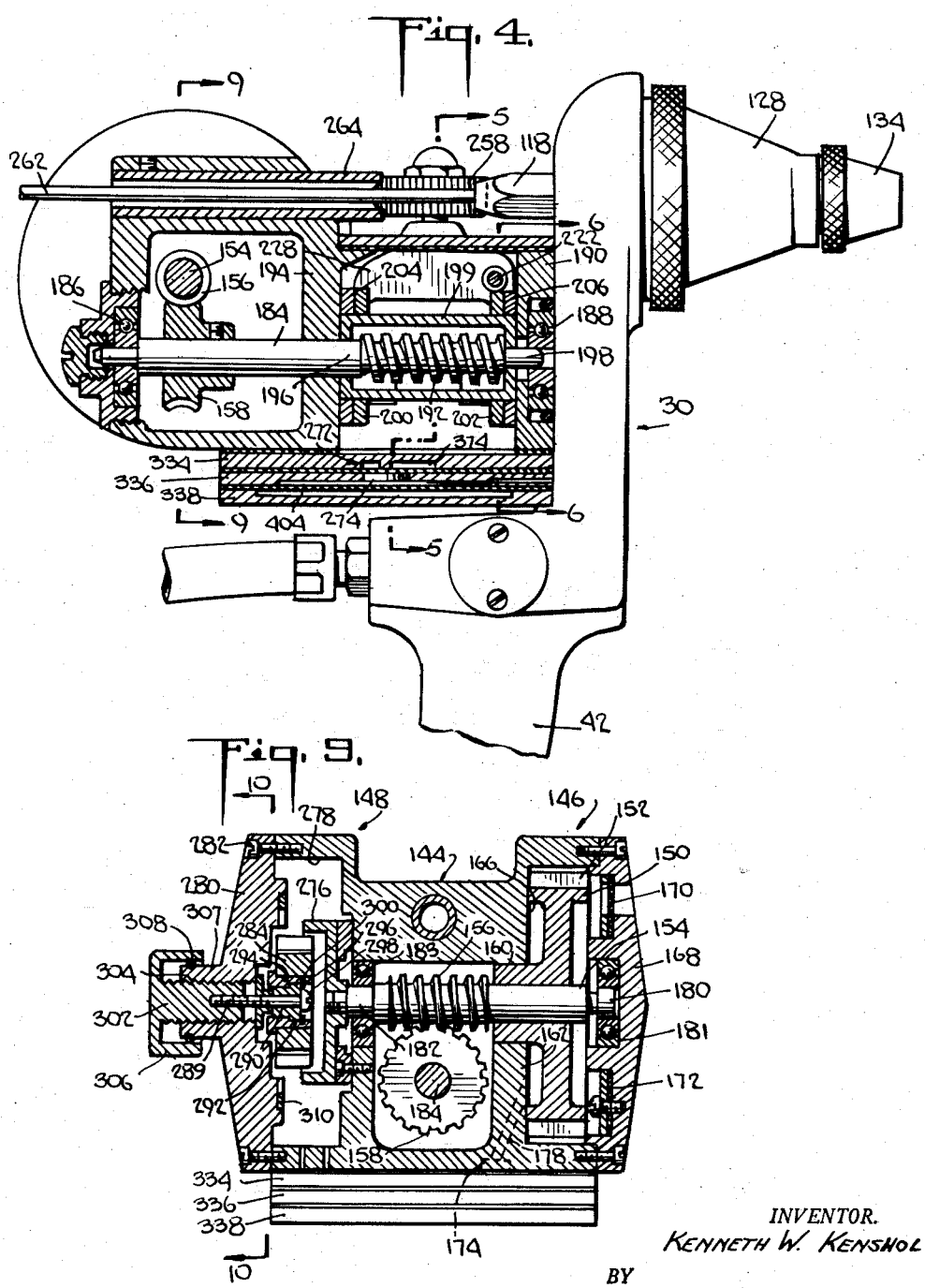

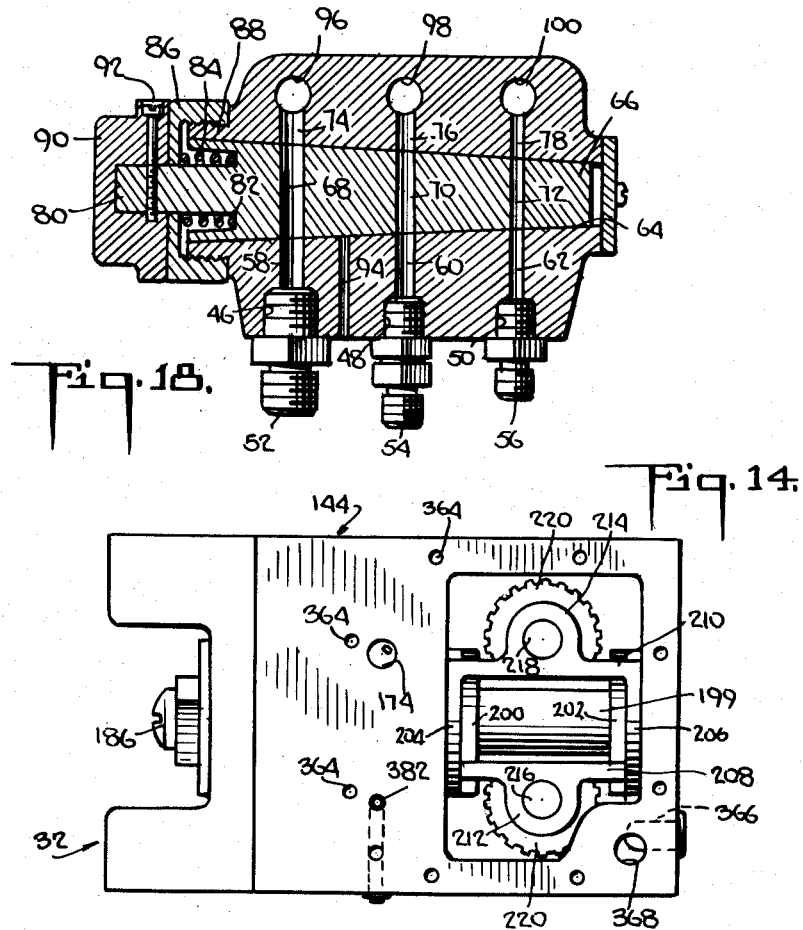

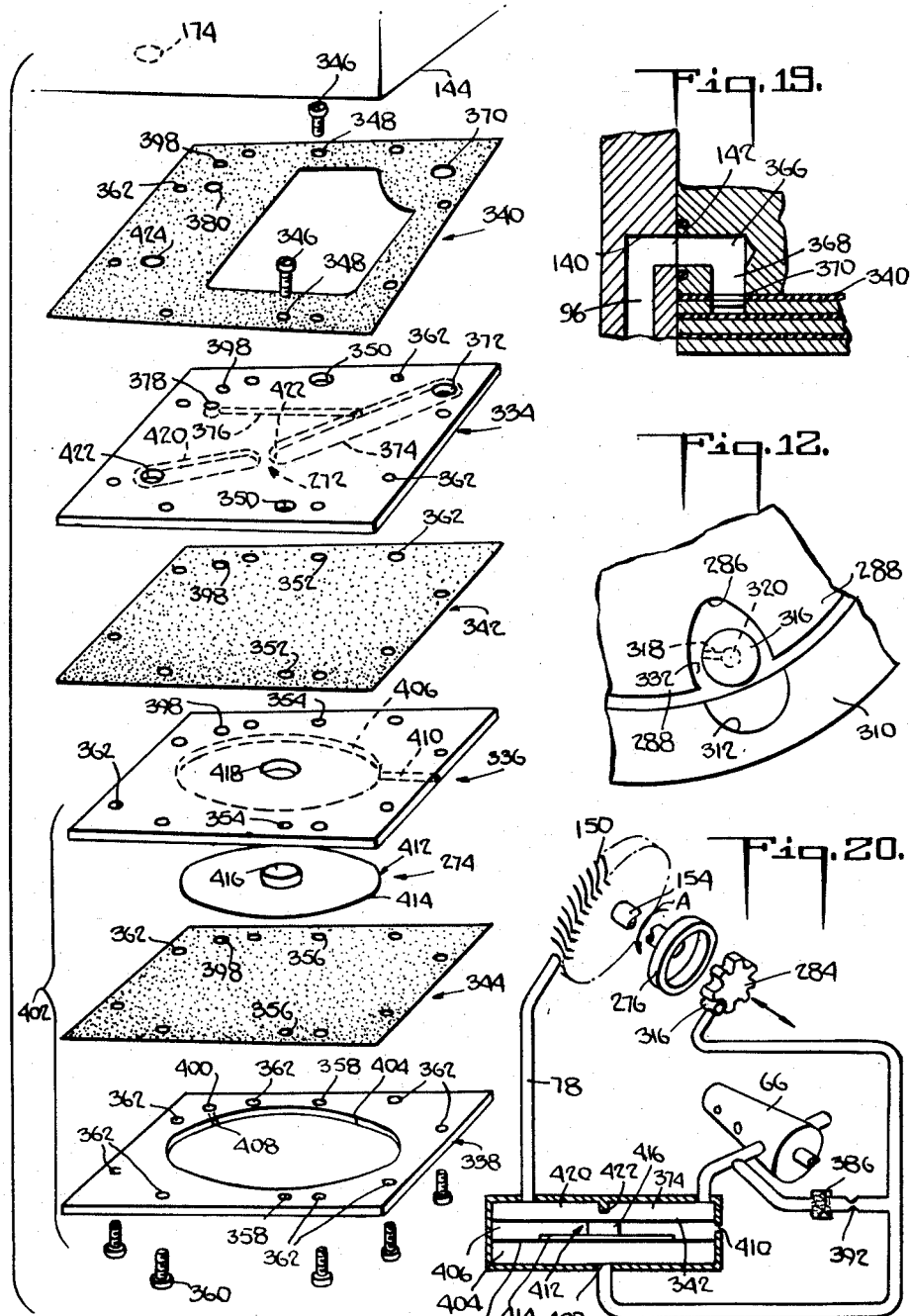

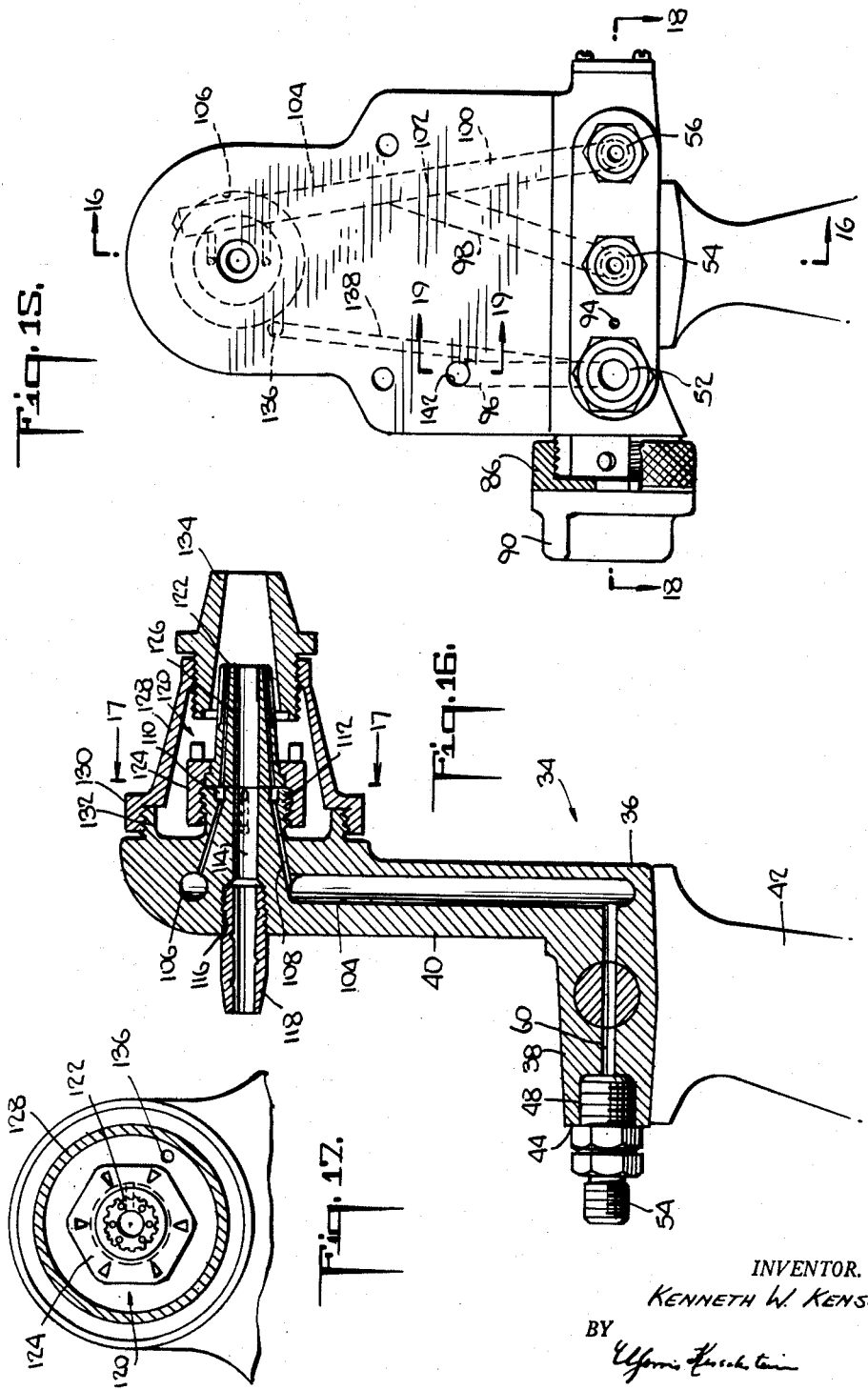

United States Patent Office 2,963,033
Patented Dec. 6, 1960

2,963,033
SPRAY GUN FOR FUSIBLE MATERIALS

Kenneth W. Kenshol, Berkeley, Ill., assignor, by mesne assignments, to Metallizing Company of America, Inc., Chicago, Ill., a corporation of Illinois Filed Sept. 23, 1955, Ser. No. 536,218

7 Claims. (Cl. 137—30)

This invention relates to a spray gun for fusible materials, guns of such nature now commonly being known as metallizing guns.

In general, guns of the character described include means for liquefying a material (usually metal), e.g., by the formation of a high temperature zone, means for feeding the fusible material to the liquefying means so as to reduce it to a molten state and means for dispensing the fused material as a spray of liquid droplets adapted to be directed on to a suitable surface.

The principal feature of the present invention is concerned with the mechanism for feeding the fusible material to the liquefying means and particularly with a speed regulation device for maintaining the rate of feed of the fusible material substantially constant at any selected value within a wide range.

Many types of speed regulators have been proposed heretofore for controlling the rate of spin of the gas turbine which conventionally drives the material feed means in guns of the character described. Nevertheless, due in large part to the very high speed of the turbine, smooth close fast accurate economical regulation by standard governors has, until now, been unobtainable Previous governors have had a limited speed range of from about one to twelve feet per minute of wire, this being the form in which the material to be sprayed usually is fed. They have not effected a close regulation so that the wire moved irregularly, i.e., was advanced in spurts, causing some droplets to be overheated and others to be underheated, causing some droplets to include solid portions and others to be oxidized or to show other deleterious effects resulting from overheating. Previous governors have been extremely wasteful of the gaseous medium utilized to drive the turbine. For instance, it has been the practice to regulate the speed of air turbines with a governor which variably brakes the turbine while the turbine is driven at full power. Previous governors have been subject to substantial wear, have been comparatively delicate, were highly susceptible to breakdown and maladjustment and were quite heavy. All previous governors have been characterized by a direct mechanical linkage between a speed sensing means and a speed controlling means, such linkage being incapable of sure and delicate adjustment and being subject to wear, friction, backlash and other inaccuracies and defects inherent in mechanical linkages.

It is an object of the present invention to provide a speed regulation device which avoids all the foregoing difficulties.

More specifically, it is an object of the present invention to provide a novel speed regulation device which has fewer parts than is conventional, is easier to repair and simpler to adjust and is considerably lighter.

It is another specific object of the invention to provide a speed regulation device of the character described which has an extremely wide range of control, e.g., from as low as two inches per minute to as high as twenty feet per minute but is, nevertheless, sure in its operation so that it will exactly maintain any selected rate of feed of wire regardless of changing conditions and thus avoid spurts and their consequent drawbacks.

It is another specific object of the present invention to provide a speed regulation device of the character described which has an extremely sensitive and rapid rate of response whereby, if the air pressure driving the turbine suddenly changes, either to increase or decrease as, for instance, when other heavy duty appliances are cut into or off of an air supply line, the rate of feed of the wire will not be noticeably altered.

It is another specific object of the present invention to provide a speed regulation device of the character described in which there is no direct mechanical connection between the speed sensing means and the speed control means so that the difficulties inherent in mechanical linkages are obviated.

It is another specific object of the present invention to provide a speed regulation device of the character described which is particularly economical in power and operates with a minimum waste of the high pressure air usually employed to drive the turbine.

It is another specific object of the present invention to provide a speed regulation device of the character described having less moving parts and in which the parts that do experience movement are subjected to a minimum of strain so that they are less likely to wear and thereby impair the accurate functioning of the governor.

Even more specifically, it is an object of the present invention to provide a speed regulation device of the character described having an air relay, that is to say, an air operated mechanism which functions to amplify the tiny power of the speed sensing means to a force sufficiently great to actuate the speed control means.

It is another specific object of the present invention to provide a speed regulation device of the character described which is highly compact and particularly reliable and is durable and foolproof.

It is another specific object of the present invention to provide a speed regulation device of the character described utilizing a magnetic and/or air-cushion linkage between the speed sensing means and the speed control means so that less movable parts are required, the size of the parts is reduced to a minimum, and the inertia of the parts is lowered whereby the device is extremely sensitive to changes in prevailing conditions.

An ancillary feature of the present invention relates to the mechanism for physically engaging the wire and feeding it to the liquefying means.

It is an object of this ancillary feature to provide a mechanism of the character described which is sturdy and positive in operation and yet can be easily and speedily engaged with or disengaged from the wire.

It is another object of said ancillary feature to provide a wire-engaging mechanism which constitutes relatively few and simple parts and is constructed to minimize wear of these parts so that it can operate for long periods of time without servicing or replacement.

Another ancillary feature of the present invention relates to the mechanism for regulating the flow of gases to the atomizing blast which forms droplets of molten metal and to the flame torch which supplies the high temperature in the melting zone.

It is an object of this second ancillary feature of the invention to provide a gas regulating means which does not bind, can be turned easily and smoothly and can be disassembled quickly for cleaning and repair.

Other objects of the invention will in part be obvious and in part will be pointed out hereinafter.

The invention accordingly consists in the features of construction, combinations of elements, arrangements of parts and series of steps which will be exemplified in the machine and process described and of which the scope of application will be indicated in the appended claims.

In the accompanying drawings, in which is shown one of the various possible embodiments of the invention:

Fig. 3 is a top view of the gun;

Fig. 4 is an enlarged view taken substantially along the line 4—4 of Fig. 3 and showing the gun block in longitudinal central section and the gun carriage in elevation;

Fig. 5 is a transverse sectional view taken substantially along the line 5—5 of Fig. 4;

Fig. 6 is another transverse sectional view through the gun, the same being taken substantially along the line 6—6 of Fig. 4 and a short distance forward of the line 5—5;

Fig. 7 is an enlarged fragmentary sectional view taken substantially along the line 7—7 of Fig. 6 and showing the structure employed for limiting movement of the lever which opens and closes the feed rolls;

Fig. 8 is an enlarged fragmentary sectional view taken substantially along the line 8—8 of Fig. 6, the same being explanatory of the operation of the cam that oppositely oscillates the feed roll cradles;

Fig. 9 is a sectional view taken substantially along the line 9—9 of Fig. 4 and illustrating certain details of the feed roll turbine and the speed responsive means, i.e., the governor;

Fig. 10 is a sectional view taken substantially along the line 10—10 of Fig. 9 and showing all but one of the principal components of the governor;

Fig. 11 is an enlarged fragmentary sectional view taken substantially along the line 11—11 of Fig. 10 and showing the position of certain of the air passageways in the speed sensing means, the air relay and the speed control means;

Fig. 12 is an enlarged fragmentary view of certain of the elements shown in Fig. 10;

Fig. 13 is an exploded perspective view of the air relay and speed control means;

Fig. 14 is a bottom view of the gun block after removal of the gun carriage, air relay and speed control means;

Fig. 15 is a rear view of the gun carriage with the gun block removed;

Fig. 16 is a longitudinal central sectional view through the gun carriage, the same being taken substantially along the line 16—16 of Fig. 15;

Fig. 17 is a transverse sectional view taken substantially along the line 17—17 of Fig. 16 and illustrating the internal construction of the gun nozzle;

Fig. 18 is a horizontal transverse sectional view taken substantially along the line 18—18 of Fig. 15 and illustrating the improved valve for controlling the flow of air and fuel gases;

Fig. 19 is an enlarged fragmentary sectional view taken substantially along the line 19—19 of Fig. 15 and showing the air passageway between the gun carriage and gun block; and Fig. 20 is a schematic diagram illustrating the operation of the magnetic-air governor, the air relay and the speed control means.

Figure 1:
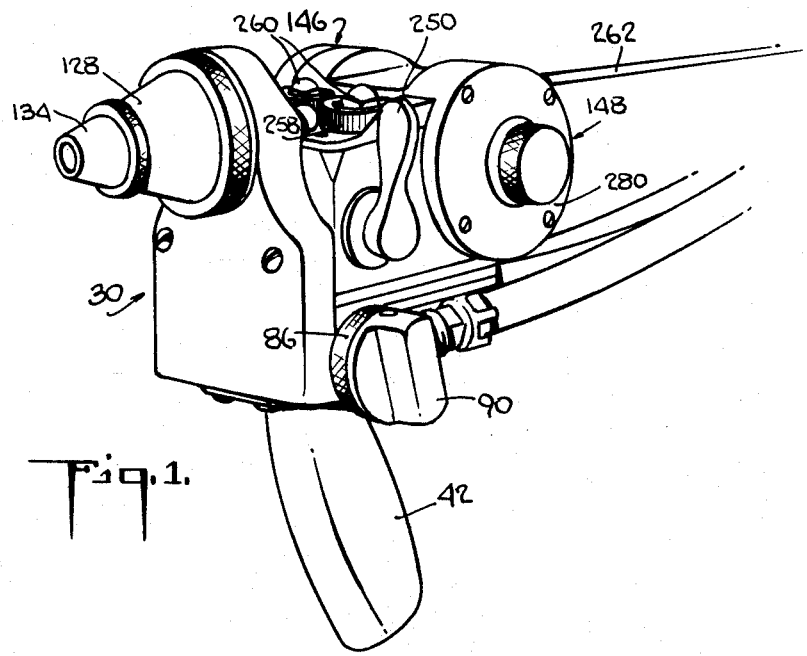
Fig. 1 is a three-quarter perspective view of a metallizing spray gun constructed in accordance with the present invention.

Referring now in detail to the drawings, the reference numeral 30 denotes a metal spray gun embodying the present invention. Said spray gun essentially includes two sections, to wit, a gun block 32 and a gun carriage 34.

The carriage (see Figs. 15 and 16), in addition to functioning as a support for the gun block, includes a burning nozzle and intake connections and a control for fuel and compressed air. The gun block (see Figs. 3, 5 and 6) includes the air turbine and feed rolls for advancing a wire of fusible material, the speed sensing means, the air relay and the speed control means which is responsive to the speed sensing means for regulating the speed of the air turbine.

More particularly, the carriage 34 comprises a frame 36 which includes a casting of generally L-shape (see Fig. 16) so as to constitute a wide horizontal base 38 and an upstanding wide front wall 40. Depending from the base is a handle 42 of any convenient shape for manual gripping. The back edge 44 of the carriage base 38 includes three tapped bores 46, 48, 50 (see Fig. 18) in which are received coupling nipples 52, 54, 56 for compressed air, compressed oxygen and a compressed fuel gas, e.g., acetylene, respectively.

Forwardly extending horizontal passageways 58, 60, 62 connect the forward ends of the nipples 52, 54, 56 to a frusto conical horizontal transverse valve bore 64 in the carriage. A frusto conical valve plug 66 is seated in said bore and includes three diametral passageways 68, 70, 72 located in the same planes as the passageways 58, 60, 62, respectively. By rotating the plug, the forward ends of the passageways 58, 60, 62 either may be closed off to shut down the gun or may be aligned with the valve passageways. In this latter position, the forward ends of the valve passageways are aligned with further horizontal forwardly extending passageways 74, 76, 78, respectively. Intermediate positions also may be selected to vary the flow of the gases.

In accordance with an ancillary feature of the invention, the mounting for the valve plug 66 is so arranged that the plug can be adjustably tightened in its bore without tending to bind the same, as it has heretofore where a tensile force has been applied to the narrow end of the conical plug to pull it into a matching bore. More particularly, this feature of the invention is carried out by exerting a compressive force on the wide end of the plug, such force preferably being transmitted through a resilient element and being provided in the manner best shown in Fig. 18.

The wide end of the plug 66 is fashioned with a slender projecting coaxial shaft 80 around the base of which an annular concentric well 82 is formed. The well receives a helical coil compression spring 84 whose bottom end is seated against the base of the well. The top end of the spring bears against the undersurface of a cap 86 which serves to hold the spring under compression. The cap is internally threaded and externally knurled and is screwed on a threaded cylindrical flange 88 projecting from the base 38 of a the gun carriage around the wide end of the valve bore 64. It will be appreciated that, as the cap is tightened on the flange, the pressure exerted by the spring 84 is increased and more strongly forces the valve plug into its bore. However, this pressure does not positively force the plug into the bore so that there is no tendency for the plug to wedge and bind. With such arrangement, it has been found that the plug turns quite easily and can be adjusted to the individual desire of any particular user without freezing the plug. Manipulation of the valve is facilitated by a handle 90 secured to the shaft 80 as by a screw 92. An oil hole 94 expedites lubrication of the valve.

The forward ends of the horizontal passageways 74, 76, 78 terminate in upwardly extending passageways 96, 98, 100, respectively (see Fig. 15). The passageways 98, 100 converge to a junction 102 where the oxygen and fuel gas intermix to form a burning mixture that is fed to the nozzle through a passageway 104 (see Figs. 15 and 16). Said passageway 104 terminates in a plenum chamber 106 located near the top of the front wall 40. Tiny feed passageways 108 lead forward from the plenum chamber to a plenum ring 110 cut in the front face of a boss 112 projecting from the front surface of the wall 40. Said boss is centrally bored to provide a horizontal wire passageway 114 through which wire is fed from the gun block 32 to the burning nozzle. The wire passageway 114 extends through the solid center of the plenum chamber and terminates at its rear end in a threaded seat 116 for a wire guide nipple 118 that protrudes from the back face of the gun carriage.

A burning nozzle 120 is carried on the front of the wall 40, being supported by the boss 112. Said nozzle includes a burner tip 122 of conventional construction, the base of which is butted against the front face of the boss 112 and is held by a flanged coupling ring 124 screwed on a male thread formed on the side of the boss. Burner passageways 126 in the tip are extended from the plenum ring 110 to the front end of the burner tip. The burner passageways converge forwardly in a conventional fashion so that the flame emanating therefrom will play on a high temperature melting zone forward of the tip.

The burning nozzle has associated therewith an air blast dispersion means which, as shown herein, constitutes a frusto conical shell 128, the wide base 130 of which is screwed on an externally threaded annular ring 132 on the front wall 40 concentric with the boss 112. The forward end of the shell is tapped to receive the rear threaded end of an air blast tip 134 forward of and concentric with the burner tip. Air is introduced into the space between the shell 128 and burner tip 122 by a forwardly extending passageway 136 (Figs. 15 and 17) which constitutes the terminus of a passageway 138 tapped off from the air passageway 96.

The upper end of the air passageway 96 has a short rearwardly extending leg 140 (Fig. 19) which terminates in an opening 142 on the back face of the front wall 40 of the gun carriage, said opening providing the air connection between the gun carriage and the gun block.

The gun block 32 includes a metal casing 144 which is suitably shaped and apertured to support the various parts hereinafter described.

The rear portion of the casing constitutes a housing for a turbine 146 and a speed sensing means 148 (Fig. 9).

Figure 2:
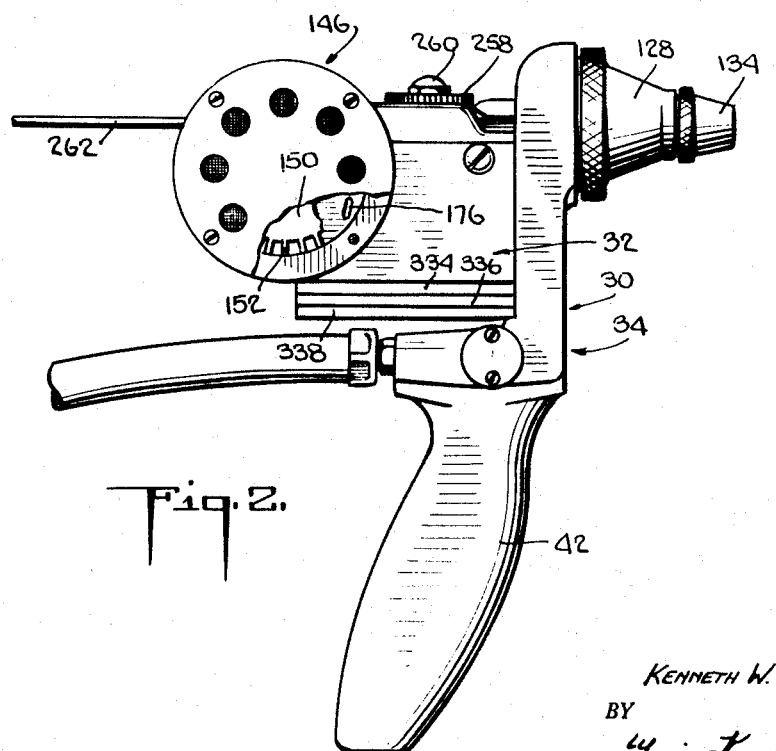
Fig. 2 is a side view of the gun, as seen from the turbine side and with portions of the turbine casing and turbine wheel broken away better to illustrate certain details of construction.

The turbine is entirely conventional and includes a turbine wheel 150 (see Figs. 2 and 9) having turbine blades 152 formed in its periphery. The wheel is fast on a horizontal cross shaft 154 carrying a worm gear 156 that meshes with a worm wheel 158 driving the wire feed mechanism. The hub 160 of the turbine wheel is journalled in a vertical partition 162 constituting a portion of the casing 144. The turbine wheel turns in a shallow circular recess 166 at one side of the casing, the recess being capped by a perforated cover 168 on whose internal face a diffusing screen 170 is held by a perforated washer 172.

Compressed air for driving the turbine is supplied in a manner which will be described hereinafter. It suffices to note at this point that high pressure air is led to the turbine portion of the gun block through a passageway 174 and then to the turbine nozzle 176 (see Fig. 2) by another passageway 178. The air leaving the turbine passes through the diffusing screen 170 which prevents foreign particles from being thrown out at high speeds. The outer end 180 of the turbine shaft is supported by a ball bearing 181 carried centrally in the cover 168. The other end 182 of said shaft is similarly supported in a ball bearing 183.

As noted earlier, the worm wheel 158 drives the means for feeding fusible wire to the melting zone. Said wheel is mounted on a jack shaft 184 (see Figs. 4, 5, 6 and 9) whose rear end is journalled in an anti-friction bearing such as the ball bearing 186 at the back of the casing 144 and whose forward end is journalled in anti-friction bearing such as the ball bearing 188 set into the front wall 190 of the casing.

A forward portion of the jack shaft is fashioned in the shape of a spiral, i.e., a worm gear 192, said portion being located between the front wall 190 of the casing and an intermediate transverse partition 194 which, in effect, separates the turbine and speed sensing means from the wire feed means. The jack shaft has journal sections 196, 198 (Fig. 4) immediately behind and ahead of the spiral section 192, these sections turning in a sleeve 199 that is fast in the casing and covers and protects the gear 192. Oscillatably mounted on said sleeve are the trunnion ends 200, 202, 204, 206 of a pair of cradles 208, 210, respectively (see Fig. 14), so that the cradles are free to rock with respect to the shaft and one another about the axis of rotation of the shaft.

The bases of the cradles are located on opposite sides of the shaft as best is seen in Fig. 14. Each base supports a substantially vertical bearing, the bearing associated with the cradle 208 being denoted by the reference numeral 212 and the bearing associated with the cradle 210 being denoted by the reference numeral 214. Said bearings rotatably support feed wheel drive shafts 216, 218, respectively. Worm wheels 220 secured on the drive shafts mesh with the worm 192 through slots 221 in the sleeve 199 so that when the bearings 212, 214 are stationary and the jack shaft 184 is rotated, the drive shafts 216, 218 are turned in opposite directions.

The bearings are maintained in fixed relationship during operation by a spindle 222 (Fig. 6) having a slotted head and a threaded shank. The shank of the spindle loosely extends through registered apertures 224, 226 in lugs 228, 230 in one piece with the cradles 208, 210. A flanged nut 232 is threaded on the tip of the spindle shank to serve as a seat for one end of a coil compression spring 234 whose other end is seated on the adjacent lug 228. Another coil compression spring 236 has an end seated on the other lug 230, the opposite end of the second coil spring abutting against a flanged end 238 of a ferrule 240 slidable on the spindle and urged against the head of the spindle by said spring 236. The spindle 222 is turned far enough into the nut 232 for the springs 234, 236 to exert considerable pressure on the two cradles and tend to turn them in opposite directions about the jack shaft, the directions being such that the upper ends of the shafts 216, 218 are biased toward one another. To rock the cradles in the opposite directions and spread the upper ends of the shafts 216, 218 apart, there is provided a double-ended cam finger 242 (see Figs. 6 and 8) which is caught between two noses 244, 246 on the cradles 210, 208, respectively.

The cam finger is carried at the end of a cam shaft 248 journalled in a side wall of the casing 144 and extending therefrom to receive a handle 250. The cam shaft is rockable in its bearing between two extreme positions defined by abutment of a pin 252 (see Fig. 7) stationary in the casing against opposite ends of an arcuate groove 254 formed in the shaft.

In one extreme position of the cam shaft (shown in Figs. 6 and 8) the cam finger 242 presents a minimum effective separating distance between the two noses 244, 246, and in this position the springs 234, 236 hold the drive shafts 216, 218 in a substantially vertical position; the cradles cannot oscillate as the shaft 184 turns since outward movement of the shafts 216, 218 is prevented by said springs.

In the other extreme position of the cam shaft the finger 242 spreads the noses apart causing the drive shafts to oscillate in such a direction that their upper ends move apart; however, the worm wheels 220 remain in mesh with the worm gear 192.

The upper ends of the drive shafts 216, 218 extend above the top of the casing 144, said ends preferably protruding through a rubber diaphragm 256 in order to enable the drive for the wire feed means to be packed in grease. The tips of the drive shafts have knurled feed rolls 258 tightly fitted thereon, the same being secured thereto by cap nuts 260.

The feed rolls engage a wire 262 of fusible material which enters the machine through a guide sleeve 264 that is mounted on top of the casing and leads to the area between the feed rolls.

It will be observed that the foregoing construction enables the feed rolls automatically to adjust themselves to different diameters of wire and to variations of diameter along the length of a given wire.

The feed rolls are guarded by a cover plate 266 seated over the casing and resting on the diaphragm 256 except around the drive shafts 216, 218. The sides of the cover plate 266 are upwardly flanged to prevent an operator's fingers from inadvertently being caught between and pinched by the feed rolls.

After emerging from the feed rolls, the feed wire enters the back end of the guide nipple 118.

In accordance with the principal feature of the present invention, a novel light and simple arrangement is utilized to variably set the speed of the turbine, and hence the speed of the feed rolls and wire, at any preselected rate of wire feed. Said means adjustably throttles the high pressure air supply for the turbine. The adjustment is dual. One adjustment is manual for setting the speed. The other adjustment is automatic and under the control of the speed sensing means. The second adjustment acts to reduce the pressure of air fed to the turbine when the turbine speed is in excess of a set feed and to increase the pressure of the air downstream of the throttle when the turbine speed falls off.

More specifically, the means for settably regulating the speed of the turbine includes a settable speed sensing means 270 (Fig. 10), a speed control means 272 (Fig. 4) and an air relay 274 (Fig. 13) between these two means to boost the comparatively weak output of the speed sensing means to a degree sufficient to enable it to operate the speed control means.

Furthermore, pursuant to a refinement of the instant invention, the settable speed sensing means is so constructed that no mechanical linkage interconnects its high speed and fluctuating parts thus enabling said sensing means to be extremely rapid in its response to variations in speed and to be unaffected by wear that otherwise would lower the accuracy of said means. It is to be understood, however, that the present invention is not to be limited to the particular speed sensing means except insofar as details thereof are recited in the appended claims.

Referring to Figs. 3, 9-14, 19 and 20 in which the structure of the speed regulating device and location of the associated passageways are shown, the settable speed sensing means 270 includes an eddy current copper lined steel cup 276 mounted on the far end of the turbine shaft 154 so as to rotate therewith. The cup spins in a shallow circular recess 278 at the side of the casing 144 remote from the turbine wheel 150. Said recess is capped by a cover 280 held in place as by screws 282. The cover is not sealed against the casing whereby to permit air leakage for a reason which later will be apparent.

A circular block 284 is centrally mounted on the inner face of the cover 280 and is received at least in part within the cup 276. Said block is made from a permanently magnetic material of high permeability such, for example, as Vicalloy II which constitutes 35% iron, 52% cobalt and 13% vanadium. The block is provided with equiangularly spaced peripheral recesses 286 in order to provide an even number of poles 288 where the lines of force are concentrated. The tips of the poles are immediately adjacent the inner side walls of the cup (see Fig. 9).

It will be appreciated that, due to the location of this strong multi-pole magnet in the rapidly spinning copper lined steel cup, an eddy force torque will be set up tending to spin the magnet in the same direction as the cup. Assuming the mass, shape and physical properties of the magnet and cup to be constant, as they will be in practice, the eddy force torque will be proportioned to (1) the speed of the cup and (2) the extent to which the magnet is telescoped into the cup. The speed of the cup is locked to the speed of the turbine. The axial position of the magnet is manually controllable.

In order to enable the magnet to be shifted axially of the cup and thereby be received to any desired degree within the cup, as well as to permit the magnet to be angularly displaced through an arc the length of which is a function of the magnitude of the eddy force torque developed, the magnet is provided with a mounting means which constitutes a pin 289 (Fig. 9). The pin fixedly supports a journal sleeve 290 on which the magnet 284 is freely revolvable. The journal is rotatably received within a bearing 292 friction fitted in a central bore 294 of the magnet.

Although the magnet is free to rotate around the pin 289, means is included to maintain it in a fixed axial position with respect thereto. Conveniently, such means constitutes a split spring washer 296 caught between the head 298 of the pin and the sleeve 290 and having its periphery received in an internal annular groove 300 in the bearing. Thus, as the pin is translated parallel to its longitudinal axis, the magnet will move into or out of the eddy current cup as the case may be. The pin is in axial registration with the turbine shaft 154 so that shifting the magnet into or out of the cup does not vary the annular space between the magnet and cup.

To axially shift the pin a threaded rod 302 is screwed into a tapped central opening 304 in the cover 280. The pin 289 is firmly secured to the rod whereby rotation of the rod will move the rod and the pin in or out of the casing 144 along a line coincident with the axis of rotation of the turbine shaft 154. Rotation of the pin will not necessarily turn the magnet 284 since the magnet is free to rotate with respect to the pin. Manipulation of the speed adjusting rod 302 is facilitated by a knurled knob 306 in one piece with the rod. If desired, a rubber ring 308 may be interposed between the internal surface of the knob and a boss 307 concentric with the opening 304 in order to stabilize the knob and thereby prevent it from shaking and also to maintain it in any set position.

Means is included to resiliently counterbalance the eddy force torque set up by the spinning cup 276 and bias the magnet to a fixed idle position. Said means comprises a yoke 310 (Figs. 9, 10 and 12) of magnetic material. Although the yoke may be permanently magnetic, it will suffice if it is made of a non-permanently magnetic material such, for instance, as soft iron. The yoke is in the form of a thin flat disc and is carried by the cover 280 in a fixed position concentric with the pin 289 that supports the magnet 284. The yoke lies in a plane at right angles to the longitudinal axis of the pin 289. The plane of the yoke also intersects the magnet.

The inner periphery of the yoke is formed with a series of indentations 312 corresponding in number and angular spacing to the indentations 286 in the magnet. Inasmuch as the magnet is very strong, it will, when no other forces are exerted thereon, assume the idle position shown in Figs. 10 and 12 in which the poles 288 of the magnet are in registry with the poles 314 of the yoke located between the indentations 312. In this position the magnetic lines of force will traverse the path of least reluctance. If the block is displaced from said idle position, a magnetically developed bias will be generated.

When the turbine is spinning, the eddy force torque created by the rapidly rotating cup acting on the magnet will angularly advance the magnet in the direction A of spin (see Fig. 10), and this force will be counteracted by an opposite restoring force developed between the yoke and magnet. Said forces quickly reach equilibrium and will exactly determine the angular position of the magnet with respect to the cap 289 at any given speed of the turbine. If the magnet is shifted further into the cup, the value of eddy force torque will increase and the angular displacement of the magnet at equilibrium will be greater. Contrariwise, as the magnet is withdrawn from the cup by manipulation of the speed adjusting rod 302, the eddy force torque will be lessened and the angular displacement of the magnet decreased. Thus, in the extreme outward position of the magnet, the speed of the turbine will have the least influence on the magnet and the magnet will be closest to its idle position on the yoke; and in the extreme inward position of the magnet it will be deflected a maximum amount.

It will be appreciated that the foregoing speed sensing means is extremely rapid in detecting changes of speed of the turbine shaft, has no speedy moving parts subject to wear and a possible source of error, and withal, is highly accurate.

As thus far described it will be seen that the speed sensing means include a mechanism to transduce the speed of rotation of the turbine into an angular position of a movable element, to wit, the magnet, with respect to a fixed element, i.e. the cover 280. In accordance with an important refinement of the invention, the speed sensing means further includes a mechanism to transduce the angular position of the magnet into an air pressure value which can be furnished to the input of the air relay 274 that regulates the speed control mechanism 272.

The transducing mechanism includes a head 316 (Figs. 10, 11 and 12) rigidly carried by the cover 280 and located within an indentation 286 between a pair of poles 288 on the magnet 284. Said head is pierced from its center to its periphery to form a jet nozzle 318 facing the leading flank 332 of the adjacent pole 288 of the magnet, that is to say, the side of the pole in the direction of movement A of the magnet under eddy force torque. Hence, as the magnet is moved further into the cup, the flank 332 will approach more closely to the orifice of the nozzle 318 and conversely, as the magnet is withdrawn from the cup, the said flank will move away from the orifice.

The nozzle 318 runs into a passageway 320 (Fig. 12) extending axially through the pin 322 that supports the head 316. Said passageway 320 terminates in a transverse passageway 324 (Fig. 11) running parallel to the inner face of the cover 280. The passageway 324 extends to a passageway 326 that terminates at an opening 328 on the inner face of the cover. Said opening serves to connect the jet nozzle to a passageway 330 in the casing 144. The passageway 330 is supplied with air at slightly above ambient pressure in a manner which soon will be described. For the present it will suffice to note that air flows from the passageway 330 into the passageway 326 and then to the passageways 324 and 320, finally emerging through the orifice in the nozzle to play as a jet upon the flank 332 of a pole 288. If said flank is close to the nozzle opening, it will obstruct flow of air therefrom, the obstruction depending upon the relative positions of said flank and head. The flank, in effect, forms an air cushion between it and the head so that the back pressure within the head is a function of the distance between the flank and the head. Thus, the angular position of the magnet with respect to the cover has been transduced into the back pressure of air within the passageway 330.

Three metal plates 334, 336, 338 are located beneath the casing 144. Elastomeric sheets such, for example, as sheets 340, 342, 344 of rubber or synthetic rubber, are sandwiched, respectively, between the bottom face of the casing and the top face of the plate 334, the bottom face of the plate 334 and the top face of the plate 336 and the bottom face of the plate 336 and the top face of the plate 338. These components of the gun are shown in exploded form in Fig. 13 to facilitate the description thereof.

The three plates and three sheets are firmly secured to one another as by a pair of screws 346 which extend through untapped registered through openings 348, 350, 352, 354, 356 in the sheet 340, plate 334, sheet 342, plate 336 and sheet 344, respectively, and are screwed into tapped blind openings 358 in the bottom plate 338 to form a unit assembly which constitutes the air relay 274 and the speed control means 272. Said assembly is firmly held against the undersurface of the casing 144 in any convenient manner as, for example, by a set of screws 360 passing through untapped openings 362 in the several lamellar elements of the assembly and received in tapped openings 364 in the casing.

The uppermost elastomeric sheet 340 and top of the uppermost plate 334 prevent escape of grease from the double worm wheel drive for the feed rolls. In addition, said sheet seals the sundry air passageways between the plates and the casing.

High pressure air entering the gun at the nipple 52 and introduced into the front of casing 144 through the opening 142 is led through a right-angle passageway 366 (Fig. 19) to a downwardly directed opening 368 in the bottom of the casing facing the block. Said opening 368 is aligned with an opening 370 in the top elastomeric sheet 340. The opening 370 is registered with a through opening 372 in the top metal plate 334 whereby to bring the high pressure air to the lower surface of said plate. Said lower surface is channelled as at 374 (see Figs. 4 and 13). The channel 374 functions as the inlet to the turbine throttle heretofore mentioned and hereinafter described in detail.

For convenience, the low pressure air feed to the jet nozzle now will be explained. A bleed passageway 376 leads high pressure air from the channel 374 along the under surface of the metal plate 334 to a through opening 378. This opening is aligned with an opening 380 in the superimposed elastomeric sheet 340 so as to redirect the high pressure air back into the casing 144 through an opening 382 (see Fig. 11). Desirably, the passageway 384 leading upwardly from said opening is provided with a filter 386 to prevent introduction of foreign material into a high pressure chamber 388. Said chamber 388 is connected to a low pressure chamber 390 through an orifice 392. The size of the orifice and of the low pressure chamber and the volume of said chamber and the passageways leading therefrom are such that the downstream pressure in the low pressure chamber is quite low, e.g. in the order of from about six ounces to one pound above atmospheric pressure.

The low pressure chamber 390 is part of the passageway 330 that runs to the jet nozzle 318. Accordingly, the air pressure in the low pressure chamber will fluctuate with the spacing of the multi-pole magnet with regard to the jet nozzle; that is to say, as the flank 332 of the pole facing said nozzle approaches closer to the nozzle opening, the rate of escape of the low pressure air from the low pressure air chamber is retarded whereby to increase the back, i.e. downstream, low pressure. Conversely, as the pole moves away from the jet nozzle, the downstream pressure drops. It will be recalled that the recess 278 is vented to the atmosphere so that there is no tendency for air pressure to build up around the magnet.

The low pressure air chamber 390 also is connected to another passageway 394, which leads downwardly to the bottom face of the casing 144. Said passageway runs into a vertical passageway 396 in the unit assembly constituting aligned through openings 398 in the elastomeric sheets 340, 342, 344 and metal plates 334, 336. The passageway 396 terminates in a well 400 in the lowermost metal plate 338.

The air relay 274 in part constitutes a balancing valve 402 (Fig. 13) including a flexible diaphragm which comprises the lowermost elastomeric sheet 344. A chamber is located on each side of said diaphragm. The lower chamber is formed by a broad shallow circular recess 404 in the upper surface of the lowermost metal plate 338. The upper chamber is formed by a broad shallow circular recess 406 in the undersurface of the middle metal plate 336. The two recesses are in vertical registration on opposite sides of the diaphragm sheet 344 (see Fig. 4) so that, if the pressure on one side is increased with respect to the pressure on the other side, the diaphragm will be deflected away from the side of greatest pressure.

The lower chamber 404 is the high pressure chamber, "high" being used in this instance in a relative rather than an absolute sense. Pressure is supplied to the chamber 404 by a bore 408 running from the well 400 into said chamber. This is the pressure ranging from about six ounces to one pound above atmospheric which fluctuates in response to the position of the flank 332 with respect to the opening of the jet nozzle 318. The low pressure chamber 406 is at atmospheric pressure, being connected to the atmosphere by a bore 410 extending from said chamber to the side wall of the metal plate.

The air relay further includes a force multiplying piston 412 having a broad section 414 and a narrow section 416. The broad section floats on the upper surface of the elastomeric sheet 344 and is guided in the recess 406 whose contour it matches. Its height is equal to the depth of said recess. However, the broad section can be deflected into the recess 404 and to permit such action the lower recess is of greater diameter than the upper recess 406. The narrow section 416 rides in an opening 418 extending from the center of the recess 406 to the upper surface of the metal plate 336. The height of the section 416 is substantially equal to the length of the opening 418. The upper surface of the section 416 rests on the undersurface of the elastomeric sheet 342.

The speed control means 272 constitutes a throttle valve, some of the parts of which already have been described. The inlet to the throttle valve constitutes the channel 374. The outlet from the throttle valve constitutes a second channel 420 formed in the undersurface of the uppermost metal plate 334. The two channels 374, 420 are separated by a narrow bridge 422 whose height is equal to the full height of the metal plate 334. Said bridge and the adjacent terminal portions of the two channels are located directly above the opening 418, and the throttling effect between the inlet and the outlet of the throttle valve is furnished by the intermediate elastomeric sheet 342 on which the narrow piston section 416 is acting.

In the operation of the amplifying air relay and speed control, the piston 412 is urged upwardly by the force of the air in the recess 404. It is urged downwardly by four pressures. These are, firstly, the force of the outside atmosphere in the recess 406 which partly balances the force of the air in the recess 404; then, secondly, the force exerted by the high pressure air in the channel 374 which presses downwardly on the elastomeric sheet 342 and biases the piston 412 downwardly; thirdly, the force exerted by the air flowing under the bridge 422; and, fourthly, the force exerted by the air in the channel 420. The net effect of all five forces is a state of equilibrium in which there will be a throttling space between the bridge 422 and the elastomeric sheet 342. The height of this space is a function of the forces. If the pressure in the chamber 404 decreases, the piston 412 will drop and the throttle valve will open wider; if the pressure in the chamber 404 increases, the throttle valve will close somewhat reducing the outgoing pressure in the channel 420.

It should be noted that the piston 412 functions to amplify the comparatively tiny differential force between ambient pressure and the back pressure in the recess 404. This effect is secured by having the pressure in the recess 404 act on the broad surface of the piston whereas the comparatively high pressure in the channel 374 acts only on a fraction of the narrow surface of the piston.

The outlet channel 420 is connected by a through opening 422 in the plate 334 and an opening 424 in the upper elastomeric sheet 340 with the passageway 174 connecting to the passageway 178 that runs to the turbine nozzle.

To understand the operation of the speed regulation device, let it be assumed that the speed adjusting knob 306 is in a certain position which has been set by the user of the gun. This will definitely locate the multipole magnet 284 a certain depth in the spinning cup 276. The eddy force torque resulting will deflect the flank 332 toward the jet nozzle. As it approaches the nozzle, the back pressure in the chamber 330 will increase. This in turn will increase the pressure in the recess 404 causing the piston 412 to lift and throttle the high pressure air feed to the turbine. Thus, the speed of the turbine will be reduced. As the speed reduces, the eddy force torque is reduced and the pressure in the recess 404 decreases so as to have an effect of opening the throttle and increasing turbine speed. In a very short period of time, equilibrium is reached and the speed of the turbine is constant.

If, now, the pressure of the air for driving the turbine suddenly is dropped, the turbine will start to slow down. As this happens, the flank 332 of the magnet will start to move away from the jet nozzle decreasing pressure in the recess 404 and opening the throttle valve wider. This will continue and the throttle valve will supply increasingly greater pressure until substantially the original speed is restored.

An increase in pressure of the high pressure air will have the opposite effect.

If the magnet is moved outwardly the eddy force torque is decreased, the back pressure in the chamber 404 is lowered and the speed is raised. Conversely, moving the magnet inwardly lowers the turbine speed.

It will be observed that, since the speed sensing parts are extremely light, the transduction effect between the speed of the turbine and the eddy force torque on the one hand and between the eddy force torque and the back pressure of the air in the recess 404 on the other hand is extremely rapid, not being hindered by appreciable masses, friction between mechanical parts and backlash, whereby the response of the regulation device is fast and accurate.

Certain features of my invention shown and described but not claimed herein are shown, described and claimed in my copending applications Serial No. 4,532, filed January 25, 1960, for Valves, and Serial No. 4,533, filed January 25, 1960, for Wire Feeding Means For Spray Guns.

It thus will be seen that there are provided a device and method which achieve all the objects of the invention and are well adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

I claim:

1. In a spray gun for fusible materials wherein a gas turbine is employed to actuate a material feeding means: that improvement constituting a speed regulation device for the turbine, said device comprising an eddy current cup rotatable with the turbine, a magnet physically juxtaposed to the cup, means mounting said magnet for rotation about an axis coincident with the axis of rotation of the cup, means biasing the magnet to an idle position whereby the position of the magnet is a function of the speed of the turbine, an element carried by said magnet whereby the position of said element likewise is a function of the turbine speed, a nozzle, means for supplying gas under pressure to said nozzle, the discharge opening of said nozzle being adjacent and facing said element whereby the pressure of gas in the nozzle upstream of the discharge opening is a function of the turbine speed, and a turbine speed control means responsive to the upstream gas pressure, said last-named means constituting a variable throttle valve for controlling the pressure of the turbine gas driving means.

2. In a spray gun for fusible materials wherein a gas turbine is employed to actuate a material feeding means: that improvement constituting a speed regulation device for the turbine, said device comprising means for transducing the turbine speed into a gas pressure which is variable as a function of said speed, two diaphragms, means providing a chamber on one side of one of said diaphragms, conduit means for introducing the variable gas pressure into said chamber, means providing a chamber on the other side of said one diaphragm, said second chamber being at ambient atmospheric pressure, a large diameter piston in said second chamber, a small diameter piston carried by said large diameter piston, said small diameter piston engaging the second diaphragm, means providing a passageway for high pressure air on the side of the second diaphragm opposite from said small diameter piston, said passageway terminating above said small diameter piston, means providing a second passageway above said second diaphragm, said second passageway starting near the termination of said first passageway and above said small diameter piston whereby the second diaphragm, piston and two passageways constitute a control valve for reducing the pressure of the high pressure air, and means connecting said second passageway to the turbine.

3. In a spray gun for fusible materials wherein a gas turbine is employed to actuate a material feeding means: that improvement constituting an eddy current member mounted to rotate with the turbine, a permanent magnet in physical juxtaposition to said eddy current member and mounted to rotate about an axis coincident with the axis of rotation of the member, said magnet having plural separate poles, and a yoke of magnetic material having plural separate poles biasing the magnet to an idle position in which the poles of the magnet and the poles of the yoke are in angular registration, said magnet being deflected angularly from said idle position continuously to a displaced angular position directly corresponding to the speed of the turbine upon rotation of the eddy current member with the turbine.

4. In a spray gun for fusible materials wherein a gas turbine is employed to actuate a material feeding means: that improvement constituting an eddy current member mounted to rotate with the turbine, a permanent magnet in physical juxtaposition to said eddy current member and mounted to rotate about an axis coincident with the axis of rotation of the member, said magnet having plural separate poles, means biasing the magnet to an idle position, a nozzle discharging against a flank of one of said poles and adjacent the same whereby the flow of gas from the nozzle will be variably impeded by said flank, means supplying gas under pressure to the nozzle, said pressure fluctuating with variations in the rate of discharge of gas from the nozzle, whereby the pressure of the gas upstream of the nozzle is a function of the speed of the turbine, and a turbine speed control means responsive to said upstream gas pressure.

5. A turbine speed regulation device comprising two ferrous elements in physical juxtaposition, one of said elements being mounted for rotation with a turbine, the other of said elements being mounted for oscillation co-axially of the first element, said other element being a permanent magnet so that said elements are magnetically coupled, means magnetically biasing the other element to a single idle position and, within the speed range of the regulation device, thereby causing said other element continuously to assume a displaced angular equilibrium position which directly corresponds to the speed of the turbine upon rotation of said one element with the turbine, and a speed control means responsive to the equilibrium position of said other element.

6. A combination as set forth in claim 5 wherein the other element is adjustable parallel to the axis of oscillation thereof to vary the magnetic coupling between it and the one element.

7. In a spray gun for fusible materials wherein a gas turbine is employed to actuate a material feeding means: that improvement constituting a nozzle, means supplying gas under pressure to said nozzle, an element adjacent the nozzle and towards which the nozzle discharges, means magnetically coupling the turbine to the element to vary the position of said element with respect to said nozzle as a function of the speed of the turbine, manually manipulatable means varying the degree of magnetic coupling to vary the position of said element with respect to said nozzle independently of the speed of said turbine, and a turbine speed control means responsive to gas pressure upstream of the nozzle.

References Cited in the file of this patent

UNITED STATES PATENTS

| | | |
|---|---|---|
| 847,597 | Onsum | Mar. 19, 1907 |
| 862,867 | Eggleston | Aug. 6, 1907 |
| 1,258,706 | Porath | Mar. 12, 1918 |
| 1,387,714 | Heylman | Aug. 16, 1921 |
| 1,700,736 | Brennan | Feb. 5, 1929 |
| 2,031,121 | Mueller | Feb. 18, 1936 |
| 2,099,849 | Holmes | Nov. 23, 1937 |
| 2,248,495 | Dupy | July 8, 1941 |
| 2,283,138 | Hagemann | May 12, 1942 |
| 2,364,810 | Noxon | Dec. 12, 1944 |
| 2,500,618 | Pugh | Mar. 14, 1950 |
| 2,536,207 | Norman | Jan. 2, 1951 |
| 2,630,814 | Daniel | Mar. 10, 1953 |
| 2,630,815 | Worthing | Mar. 10, 1953 |
| 2,646,814 | Mueller | July 28, 1953 |
| 2,664,906 | Lautzenhiser | Jan. 5, 1954 |
| 2,807,734 | Lehde | Sept. 24, 1957 |

FOREIGN PATENTS

| | | |
|---|---|---|
| 700,398 | Germany | Dec. 19, 1940 |